Aug. 23, 1938.  L. J. LINDE  2,128,149
ELECTRIC SWITCHGEAR
Filed Dec. 12, 1936

Inventor:
Leonard J. Linde,
by Harry E. Dunham
His Attorney.

Patented Aug. 23, 1938

2,128,149

UNITED STATES PATENT OFFICE 2,128,149

ELECTRIC SWITCHGEAR

Leonard J. Linde, Drexel Hill, Pa., assignor to General Electric Company, a corporation of New York Application December 12, 1936, Serial No. 115,643

5 Claims. (Cl. 175—298)

My invention relates to electric switchgear of the draw-out type, more particularly to means for effecting movement of the circuit breaker unit and for guiding the same between connected and disconnected positions, and has for its principal object the provision of improved switchgear of the aforesaid type which is relatively compact in design for a given size circuit breaker unit, efficient and positive in operation, and simple and rugged in construction.

The application of circuit breaker units, such as heavy duty air circuit breakers, for example, to draw-out type switchgear necessitates a relatively compact design since these units are often used where space is a very important factor, such as in underground substations, for example. In such installations it is highly desirable that the switchgear units occupy minimum space when in normal operation, but that compactness in design is not accomplished at the sacrifice of accessibility to the switchgear unit when it is withdrawn to the disconnected position, or at the expense of the efficiency of the draw-out mechanism.

In accordance with my invention, compactness in design is accomplished without sacrificing any of the more desirable features by providing a collapsible extensible guide for the circuit breaker unit and by operating the draw-out mechanism in a direction generally parallel to the base panel of the circuit breaker unit, i. e., transverse to the movement of the breaker unit. Accordingly, the lateral space required for the draw-out mechanism exceeds at no time during the operation thereof that required for the minimum dimensions of the mechanism.

My invention will be more fully set forth in the following description referring to the accompanying drawing, and the features of novelty which characterize my invention will be pointed out with particularity in the claims annexed to and forming a part of this specification.

Figure 1:
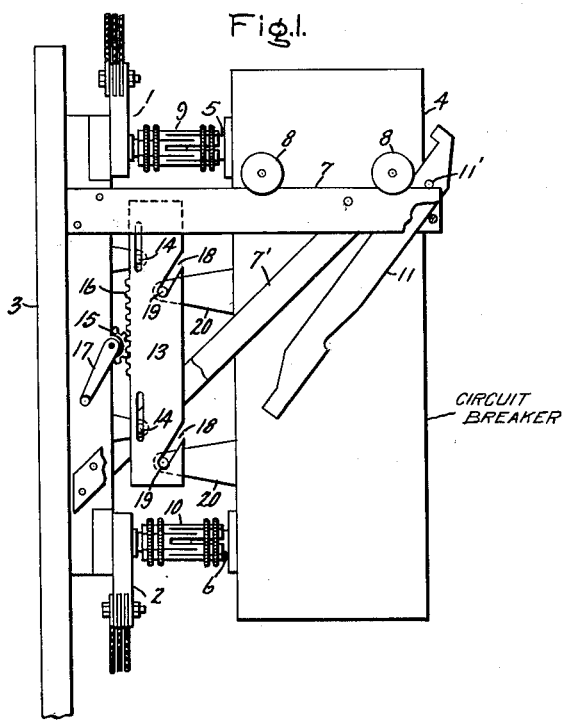
Figure 2:
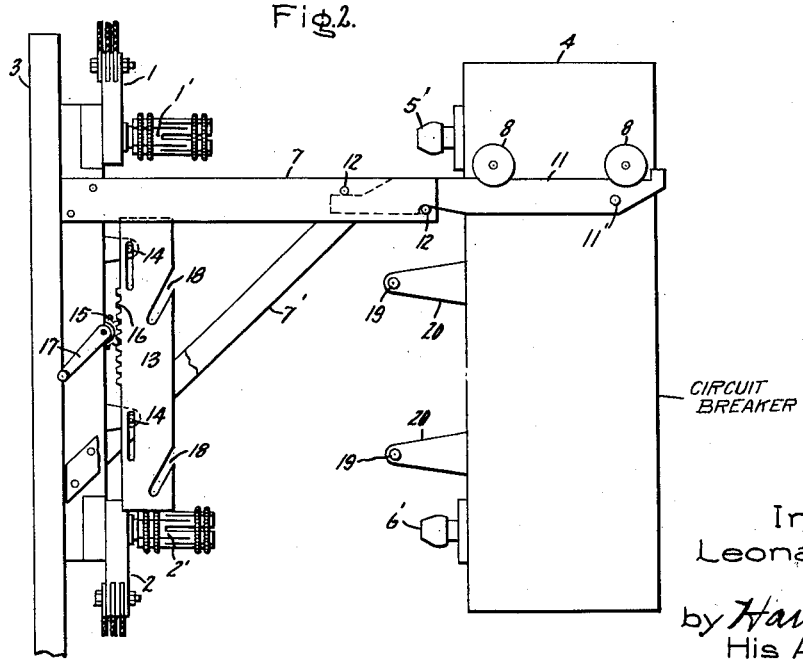

Referring to the drawing, Fig. 1 is an elevational view partly in section of draw-out type switchgear in the connected position embodying the present invention, and Fig. 2 is a similar view showing the switchgear unit in the disconnected position.

The draw-out switchgear shown by Fig. 1 comprises stationary circuit terminals generally indicated at 1 and 2 mounted on a vertical supporting panel 3. A circuit breaker unit 4 which is provided with terminals indicated at 5 and 6 is relatively movable with respect to the fixed terminals between connected and disconnected positions and is supported and guided for horizontal reciprocal movement by means of a pair of horizontal guide rails 7 between which the unit 4 is positioned, and rollers 8 mounted on the unit 4.

The circuit breaker unit 4 includes a power interrupting breaker, such as a heavy duty magnetic blow-out air circuit breaker, for example, and is normally closed when the unit is connected as shown by Fig. 1. Prior to disconnection of the unit at the stationary terminals the circuit breaker is opened in accordance with well-known practice. The details on the circuit breaker are not shown since the breaker per se forms no part of the present invention and a detailed description thereof is unnecessary for a complete understanding of the invention.

The disconnecting devices for connecting the breaker unit 4 to the terminals 1 and 2 are generally indicated at 9 and 10 respectively, and as shown are of the plug and socket type. As best illustrated by Fig. 2 which shows the disconnecting contacts in the open circuit position, the breaker terminal contacts at 5' and 6' engage coacting socket contact members 1' and 2' which are connected to the terminals 1 and 2 respectively. The disconnect contacts per se are described in detail and claimed in my copending application for Electric disconnecting devices, Serial No. 115,642, filed concurrently herewith and assigned to the same assignee as the present invention.

When the circuit breaker is in the connected position as shown by Fig. 1, it is supported by the rollers 8 and by the guide rails 7 at opposite sides of the unit, the rails 7 supporting the unit in cantilever fashion and being braced with respect to the panel 3 as at 7'. When the breaker is rolled to its disconnected position as shown by Fig. 2 it is supported at each side by a collapsible extension 11 of the guide rail, which is manually extended to the position shown prior to the disconnecting operation. The extension 11 is also supported in cantilever fashion at the end of the rail 7 by pins 12 secured to said rail.

When the unit 4 is rolled inward toward the connected position, the extension 11 is rotated manually about the pins 12 and slides downward to the collapsed position shown by Fig. 1 wherein it is held by a pin 11' secured to the extension and engaging the guide rail 7. For the purpose of suitably guiding the extensions 11, each guide rail is bifurcated as illustrated.

The draw-out mechanism comprises essentially a vertically movable cam member or plate 13 at each side of the unit, each cam member being mounted on and vertically guided with respect to the panel 3 as by pin and slot connections indicated at 14. Vertical reciprocal movement of each member 13 is effected by a pinion gear 15 coacting with a rack 16 forming a part of the cam member and an operating crank 17 for rotating the pinion gear. The operating crank 17 operates through a common shaft both cam members 13 for simultaneously operating the same.

The cam connections between the member 13 and the unit 4 include a pair of inclined slots at 18 formed in each cam member opposite the breaker unit adapted to receive rollers 19 which are carried by rearwardly extending lugs 20 secured to the base panel of the circuit breaker unit. The slots are so arranged with respect to the rollers that when the rollers are in the lower parts of the slots as in the breaker connected position illustrated by Fig. 1, lowering of the cam member 13 is effective to force the breaker unit 4 towards the right and out of engagement with the disconnecting contacts. After the contact engagement is broken, the unit 4 is free to be rolled to the disconnected position illustrated by Fig. 2 where it is readily available for inspection or repair.

The connecting operation is performed by rolling the unit 4 to the point where the rollers 19 enter the slots 18, after which the cam member 13 is racked upward to force the disconnect contacts into complete engagement. Since the unit 4 is acted upon by the draw-in force at four points on its base panel, the unit is forced into its operative position evenly and smoothly and without binding.

It will be noted that the lateral space required by the draw-out mechanism need be not greater than the width of the cam member itself. This is particularly important in certain types of air-circuit breakers, for example, wherein the maximum dimensions are in the vertical as contrasted with the horizontal or draw-out direction. In order to maintain the total space factor as low as possible, it is therefore highly desirable to limit the maximum horizontal dimensions. This is not readily done with conventional draw-out mechanisms.

It should be understood that my invention is not limited to specific details of construction and arrangement thereof herein illustrated, and that changes and modifications may occur to one skilled in the art without departing from the spirit of my invention.

What I claim as new and desire to secure by Letters Patent of the United States is:

1. Electric switchgear of the draw-out type comprising electric circuit terminals, a circuit-interrupting unit relatively movable with respect thereto, and means for effecting bodily movement of said unit relative to said terminals including a cam member movable transversely of the direction of movement of said unit and along a substantially longitudinal path, said cam member having comparatively limited dimensions with respect to said direction of movement for insuring compactness of said switchgear.

2. Electric switchgear of the draw-out type comprising a stationary panel, electric circuit terminals mounted in spaced relation on said panel, a circuit-interrupting unit movable with respect to said terminals in a direction generally at right angles to said panel, and means for effecting bodily movement of said unit relative to said terminals including a cam member mounted on said panel in close proximity thereto and guided for longitudinal reciprocal movement only in a direction transverse to the direction of movement of said unit.

3. Electric switchgear of the draw-out type comprising a stationary panel, electric circuit terminals mounted in spaced relation on said panel, a circuit interrupting unit movable with respect to said terminals in a direction generally at right angles to said panel, and means for moving said unit toward and away from said terminals including a cam member guided for longitudinal reciprocal movement only in a direction transverse to the direction of movement of said unit, said cam member mounted on one part of said switchgear in close proximity thereto, rollers coacting with said cam member mounted on another part of said switchgear and gear structure for effecting reciprocal movement of said cam member.

4. Electric switchgear of the draw-out type comprising stationary circuit terminals, a circuit-interrupting unit guided for longitudinal reciprocal movement with respect thereto, and means for effecting bodily movement of said unit relative to said terminals comprising a cam member guided for longitudinal reciprocal movement in a direction transverse to the direction of movement of said unit, said cam member having cam faces inclined with respect to both directions of movement of said cam member and circuit-interrupting unit respectively, and means mounted on said unit for coacting with said cam faces arranged so that longitudinal movement of said cam member is effective to force said unit into connected or disconnected position.

5. Electric switchgear of the draw-out type comprising a vertically positioned panel, electric circuit terminals mounted in spaced vertical alinement on said panel, a circuit-interrupting unit guided for horizontal reciprocal movement with respect to said terminals, and means for effecting bodily reciprocal movement of the unit between connected and disconnected positions including a pair of cam plates mounted on said panel and guided for vertical reciprocal movement, said cam plates being laterally spaced on said panel for coacting with opposite sides of said unit, each of said cam plates having a plurality of slots opening towards said unit and inclined with respect to the directions of movement of both said cam member and unit, a plurality of rollers carried by said unit at the rear side thereof for coacting respectively with said slots, and means for effecting simultaneous vertical reciprocal movement of said cam plates for applying at said rollers a force for uniformly moving said unit either to its connected or disconnected position with respect to said terminals.

LEONARD J. LINDE.